United States Patent [19]

Lupke

[11] Patent Number: 4,936,768

[45] Date of Patent: Jun. 26, 1990

[54] EXTRUSION DIE FOR EXTERNALLY RIBBED PLASTIC TUBING

[76] Inventor: Manfred A. A. Lupke, 92 Elgin St., Thornhill, Ontario, Canada, L3T 1W6

[21] Appl. No.: 345,243

[22] Filed: May 1, 1989

Related U.S. Application Data

[60] Continuation-in-part of Ser. No. 61,820, Jun. 15, 1987, abandoned, which is a division of Ser. No. 843,516, Mar. 25, 1986, Pat. No. 4,712,993.

[51] Int. Cl.$^5$ .................. B29C 49/04; B29C 49/38
[52] U.S. Cl. .................. 425/532; 425/539; 425/326.1; 425/387.1; 425/392
[58] Field of Search .............. 425/72.1, 113, 131.1, 425/532, 539, 369, 370, 387.1, 392, 396, 371, 326.1, 466; 264/508

[56] References Cited

U.S. PATENT DOCUMENTS

| | | | |
|---|---|---|---|
| 2,859,476 | 11/1958 | Lainson | 425/462 |
| 2,972,780 | 2/1961 | Boonstra | 264/26 |
| 3,305,893 | 2/1967 | Machen | 166/270 |
| 3,327,038 | 6/1967 | Fox | 264/209.8 |
| 3,478,144 | 11/1969 | Sato | 264/313 |
| 3,677,676 | 7/1976 | Hegler | 425/504 |
| 3,994,646 | 11/1976 | Hauck | 425/133.4 |
| 3,996,323 | 12/1976 | Hegler et al. | 264/508 |
| 4,199,314 | 4/1980 | Lupke | 425/532 |
| 4,226,580 | 10/1980 | Lupke et al. | 425/369 |
| 4,305,703 | 12/1981 | Lupke | 425/72.1 |
| 4,365,948 | 12/1982 | Chaplain | 425/417 |
| 4,500,284 | 2/1985 | Lupke | 425/511 |
| 4,534,923 | 8/1985 | Lupke | 425/532 |
| 4,710,337 | 12/1987 | Nordstrom | 264/508 |

*Primary Examiner*—Willard Hoag
*Attorney, Agent, or Firm*—Leydig, Voit & Mayer

[57] ABSTRACT

An extrusion die for externally annularly ribbed seamless plastic tubing has an elongated nozzle within which a hollow mandrel is placed. The nozzle and mandrel define an annular extrusion orifice for extrusion of a parison. The orifice has a coaxial conical portion with its generatrix forming an angle of more than 45° with the longitudinal axis of the nozzle for efficient filling of mold cavities corresponding to annular ribs of the formed tube. The diameter of the inner conical portion at its delivery end may be at least that of the outer portion.

7 Claims, 2 Drawing Sheets

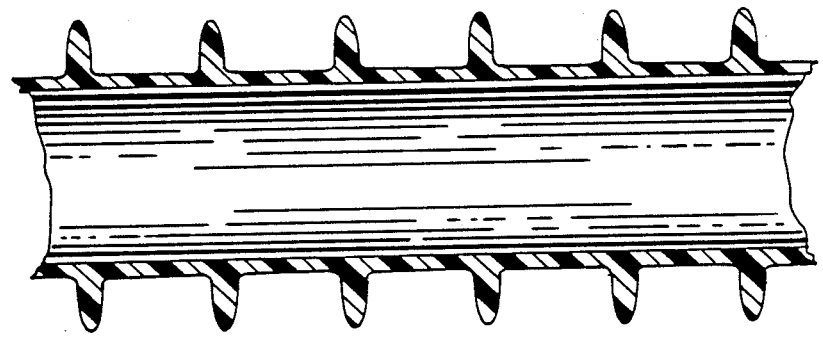
FIG. 2
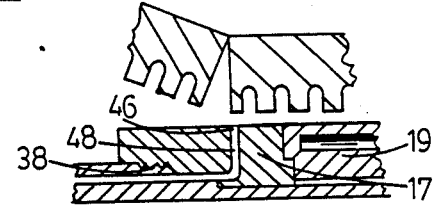
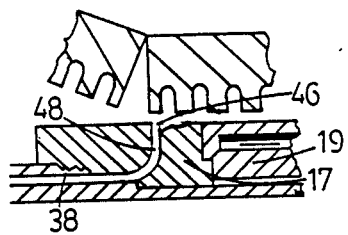
FIG. 3
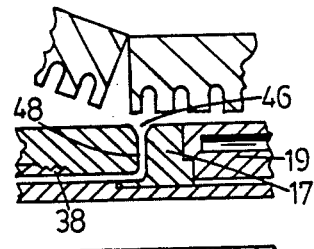
FIG. 4
FIG. 5

EXTRUSION DIE FOR EXTERNALLY RIBBED PLASTIC TUBING

This application is a continuation-in-part of application no. 061,820, now abandoned which was a divisional of Ser. No. 843,516 filed Mar. 25, 1986, now U.S. Pat. No. 4,712,993.

BACKGROUND OF THE INVENTION

1. Field of the Invention

The invention relates to extrusion dies for extrusion of plastic tube having a smooth inner surface and an annularly ribbed or finned outer surface, i.e. an outer surface having alternating annular ribs and grooves.

2. Background of the Invention

Plastic tube for a variety of purposes, for example, underground drain pipes frequently needs considerable strength against crushing. Often such pipe is corrugated for strength or is double walled corrugated pipe. The manufacture of corrugated single or double walled pipe has necessitated the design of a variety of apparatus to produce suitable pipe. Double walled pipe especially, has provided some problems.

It has become apparent that, at least for some uses, ribbed pipe rather than corrugated pipe has certain advantages. Ribbed pipe may have good stiffness against crushing and its manufacture was thought to be free of the difficulties associated with uniting the two walls of double walled corrugated pipe. Ribbed pipe may be manufactured by extruding a continuous parison into a travelling mold of mold blocks defining the ribs and grooves of the resulting pipe. Examples of such apparatus are disclosed in U.S. Pat. No. 3,891,007 issued June 1975 to Kleykamp, U.S. Pat. No. 4,710,337 issued January 1987 to Nordstrom, and U.S. Pat. No. 4,721,594 issued January, 1988 to Jarvenkyla.

At least Kleykamp, in U.S. Pat. No. 3,891,227, appears to have appreciated that difficulty might be encountered in filling the mold cavities in that he fills the mold cavities with one stream of extrudate and then applies a smooth inner wall. The ribs used by Kleykamp do not appear very deep in comparison with the diameter of the resulting tube and are referred to as "an undulating outside surface". Nordstrom in U.S. Pat. No. 4,710,337 also clearly appreciates the problem and solves it in a similar manner to Kleykamp i.e. he first fills the ribs and secondly thickens the tubing wall.

In fact, in practice, difficulties are encountered in filling the mold cavities to form the ribs.

Jarvenkyla in U.S. Pat. No. 4,721,594 illustrates exit angles of extrudate of less than 45° and, alleges that an angle of 2 to 30° is important. Moreover, Jarvenkyla discusses the pressure variations set up and attempts to justify some correlation with an apparent angle of between 2 and 30° to the axis.

When a mold cavity of a travelling mold for forming a rib comes into a position to be filled from an extrusion orifice of an extrusion nozzle, the cavity to be filled is appreciable and the extrudate flows easily resulting in a reduction of pressure in the nozzle. As the mold advances, a ridge of the travelling mold comes adjacent the extrusion orifice causing pressure to rise. As a result, a rhythmic pressure surge may be set up producing various apparatus strains and resulting wear.

SUMMARY OF THE INVENTION

It has now surprisingly been found that if the angle of the exiting extrudate from the extrusion nozzle is increased to above 45°, the reliability of the process may be improved. This is especially surprising in view of Jarvenkyla who believed that a much sharper angle was important. The reasons for the improved reliability are not fully understood but it is theorized that by directing the extrudate at greater angle into the ribbed mold, when coupled with the significant directional change in flow direction of molten thermoplastic material, the greater angle appears to render the molding process more efficient and reliable. This phenomenon may result from flow considerations. The absorption of back pressure, due to the greater angle, developed during molding of the thinner (non-ribbed) portion, while allowing sufficient flow into the mold cavities for the production of ribs, may contribute to this enhanced reliability.

According to the invention, there is provided an extrusion device for manufacture of thermoplastic tubing having external ribbing, comprising; an extrusion head having an inlet for extrudate and a central bore, an elongated nozzle including a flange attachable to said extrusion head, an extrudate supply passage extending from the extrusion head and an outlet, means for attaching said nozzle to said head, a mandrel dimensioned to be placed in said supply passage in a substantially coaxial relation with said nozzle and spaced apart therefrom, said mandrel having an outlet defining element which cooperates with said nozzle outlet to define an outlet orifice, means for connecting said mandrel to said extrusion head, adjustment means for translating said mandrel outlet defining element relative to said nozzle outlet to select the size of said outlet orifice, and means for forming a panison of extrudate issuing from said outlet at an angle of substantially more than 45° including said nozzle outlet and mandrel outlet defining element which are configured to direct the panison issuing from said outlet at an angle of substantially more than 45° relative to the direction of the translation axis of said mandrel defining element.

The extrusion die is intended for use with a travelling mold tunnel comprising pairs of cooperating mold blocks forming the tunnel. The recesses of the mold blocks are usually radial to the axis of the mold tunnel to form radial ribs of the resulting tube. For such ribs, the angle of extrudate issuing from the outlet may conveniently be about 90°. The production of tubing having ribs angled to the axis of the tubing is not especially contemplated by this invention but it is noted that if such ribs are desired, the mold recesses therefor will normally extend forwardly in manufacture and the ribs will usually be angled at more than 45° to the axis.

An exit angle of more than 45° for extrudate remains suitable for the production of angled ribs.

BRIEF DESCRIPTION OF THE DRAWINGS

An embodiment of the invention will now be described with reference to the drawings in which:

FIG. 2 illustrates a one embodiment of ribbed pipe which may be produced.

FIG. 3 illustrates a fragment of a die similar to that of FIG. 1 but having a different exit angle for the panison;

FIG. 4 illustrates a fragment of another die showing a modified exit channel; and FIG. 5 illustrates another modified exit channel.

DESCRIPTION OF THE PREFERRED EMBODIMENT

Figure 1:
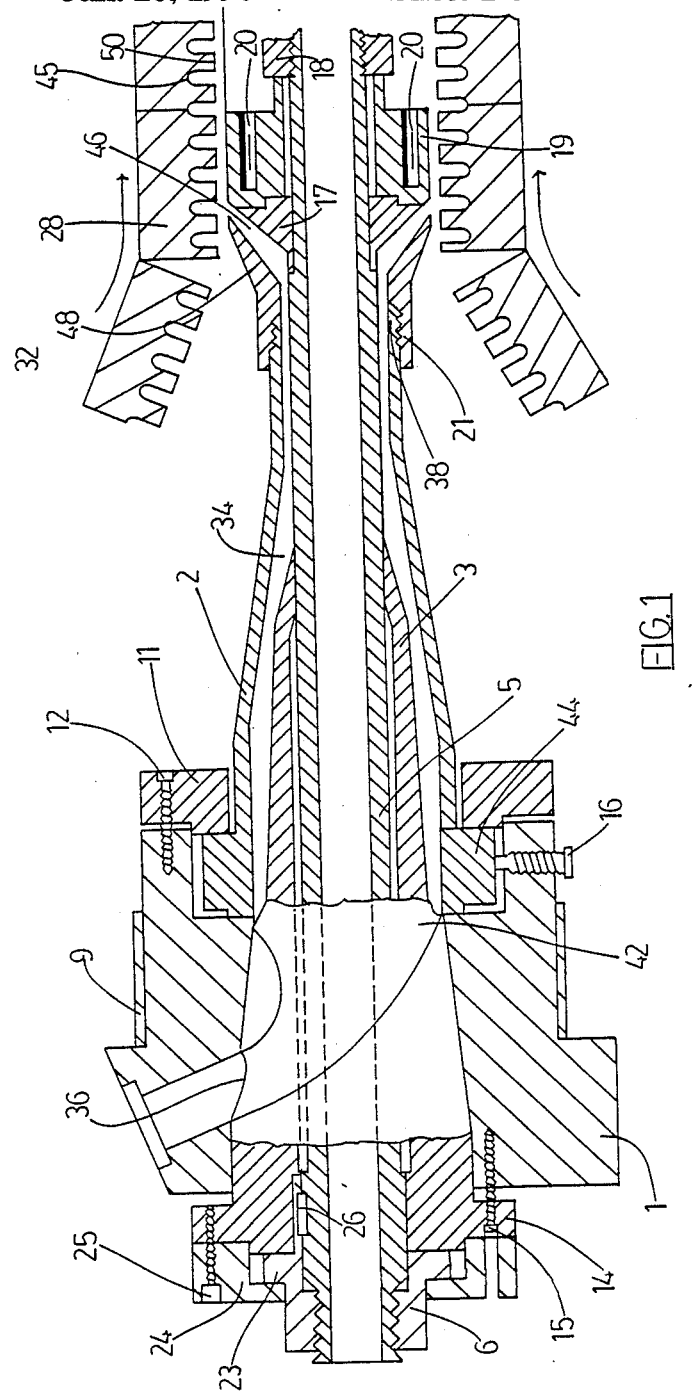
FIG. 1 is a longitudinal section of the present die for an apparatus producing plastic pipes with a smooth interior and an annularly ribbed exterior.

Apparatus for delivering extrudate to a travelling mold 32 comprises an elongate extrusion nozzle 2 located coaxially about an elongate mandrel 3 and a carrier member 5 to define an annular channel 34 for extrudate.

The mandrel 3 has a rear circumferential flange 14 by which it is clamped to extrusion head 1 by clamping bolts 15 so that extrudate from extrusion passage 8 of the extrusion head 1 may flow into the annular channel 34. The extrusion passage 8 of circular cross section may join the annular channel 34 through a horn shaped channel 13 in the outer surface of the mandrel 3, which outer surface, in that region, substantially fits a bore of the extrusion head 1. At its narrow end, channel 13 registers with entry port 36 of extrusion passage 8. From the narrow end the channel 13 extends with a helical twist towards the annular channel and its wide end extends wholly around the mandrel 3 to be coextensive with annular channel 34. The direction of channel 13 at its narrow end is such that it is generally aligned with passage 8 which may be arranged tangentially to mandrel 3.

Mandrel 3 forms a sleeve around an elongate tubular member 5 which projects out of the mandrel 3 at each end. Forwardly of mandrel 3, in the region of entry to travelling mold 32, tubular member 5 extends through an axial bore of a conically shaped exit mandrel 17.

Mandrel 17 is located in position by stops 38 of tubular member 5 to its rear and by locking nut 18 screw threadedly engaging the forward end of tubular member 5 which projects into travelling tunnel mold 32. A sizing plug 19 for sizing and smoothing the inside surface of formed tube incorporating element recess 20 is suitably provided between nut 18 and exit mandrel 17.

Immediately downstream of channel 13 in mandrel 3, elongate extrusion nozzle 2 is connected to extrusion head 1 to register with exit port 40 of the extrusion head 1. A circumferential flange 44 at the upstream end of nozzle 2 abuts the extrusion head 1 and is held in place by annulus 11 which is bolted to the extrusion head 1 by bolts 12. The nozzle 2 may be centered with respect to mandrel 3 by centering bolt 16.

A funnel shaped member 46 is carried by the downstream screwthreaded portion 21 of nozzle 2 to be coaxial with exit mandrel 17 and forming with exit mandrel 17 diverging exit channel 48 for extrudate. The diverging exit channel 48 is generally cone shaped, its generatrix forming an angle of more than 45° with the axis. It is noted that the axis referred to is that of the diverging exit channel 48 and the various coaxial members, e.g. the exit mandrel 17, the mandrel 3, the elongate nozzle, the tubular member and the tunnel of the travelling mold 32.

The travelling mold may be made up of two conveyors of cooperating mold blocks 28 which, on cooperating runs of the conveyors, come together to form a mold tunnel. Each mold block is provided with spaced troughs 49 and ridges 50 to form, in the tunnel, annular troughs 49 and ridges 51. Each annular trough 49 molds a rib 52 of the resulting tube and each ridge 51 molds a thinner tube portion between the ribs.

As shown, ribs 51 have considerable radial depth in comparison with the diameter of the tube but this is not necessarily always the case. However, when deep ribs are required it is easy to see that problems might arise in properly filling the mold troughs 49.

It is important in apparatus according to the present invention that the angle of the diverging exit channel 48 to the axis is more than 45°. When this is so, improvements in filling mold troughs 49 with improvements in the degree of pressure surging may be experienced.

Exit channel 48 may be adjustable in width by axial displacement of tubular member 5 for adjustment of flow of extrudate. This may be achieved by means of adjustment of nut 6 threadedly engaged with member 5. Nut 6 has a circumferential flange 23 retained against axial displacement by annulus 24 bolted to mandrel 3 by circumferentially spaced bolts 25. There is, however, sufficient clearance between annulus 24 and mandrel 3 to allow rotation of nut 6. Nut 6 is thus not free to move axially. Relative rotation between member 5 and nut 6 will therefore result in axial displacement of member 5.

Rotation of tubular member 5 might result in rotation forces on the extrudate resulting in strains in the resulting tube. Therefore the tubular member 5 is keyed to mandrel 3 at key 26 to inhibit such rotation.

Services to the mold tunnel may be provided through the core of tubular member 5.

FIGS. 3, 4 and 5 show advantageous exit channels 48.

FIG. 3 shows a fragment of an extrusion die having an exit channel 48 at right angles to the axis of the tube. This angle is, in practice, not only suitable for the production of radial ribs, but also the practical maximum angle. When the angle is around 90°, it is convenient that it merge smoothly with the axial passage of the extrusion die, for example, the exit passage 48 may curve into the 90° passage as shown in FIG. 3.

FIG. 4 illustrates a modified 90° exit passage in that it widens to front and rear as it opens to the mold. Such a construction serves to emphasize that the upper practical limit of 90° for the passage is not absolute. Widening of the passage may help in smoothing out rhythmic alternations in pressure due to spread of extrusion pressure between a mold recess and an adjacent wall.

FIG. 5 shows an alternative form of widening the passage.

I claim:

1. An apparatus with a single extrusion nozzle for use with an extruder for producing solid wall plastic pipe having smooth cylindrical inner surface and an annularly solid-ribbed outer surface formed with spaced apart ribs and which apparatus comprises:

a pair of complementary mold assemblies each comprising an endless train of mold blocks travelling in endless forward and return runs and cooperating in pair along said forward run to form an axially extending tubular mold tunnel, said mold blocks being provided on their inner surfaces with recesses, in said opposed mold blocks cooperating to provide annular recesses;

an extrusion head for discharging an extrudate of thermoplastic material and having a central bore for receiving thermoplastic material under pressure;

an elongate hollow nozzle attached to said head and extending in the axial direction therefrom to a delivery end thereof, said delivery end of the nozzle having an internal conical configuration;

a mandrel having a conical part diverging forwardly and disposed within said nozzle in substantially coaxial relation to said nozzle, the angle of the generatrix of the conical part being at least 45° to the axis, the conical part being spaced from the nozzle to provide a plastic-conducting passage diverging forwardly and defining a single annular extrusion orifice for undivided, uninterrupted flow of said extrudate, said nozzle and said conical part defining an annular extrusion orifice through which the extrudate can flow to form a parison within the nozzle and around the mandrel, and a plug directly connected to said conical part and downstream of the mandrel to form smooth cylindrical inner walls in the resulting tube.

2. An extrusion device for manufacture of thermoplastic tubing having external solid ribbing and a smooth cylindrical inner surface, for attachment to an extrusion head, comprising:

an elongated nozzle attachable to the extrusion head, said nozzle having an inlet end connectable to the extrusion head, an outlet end including a first element of a cooperating parison forming member, and a bore extending the length of said nozzle.

a mandrel having a first end and a second end, said mandrel being dimensioned to fit within and extend substantially coextensively with said nozzle to form a passage for fluid communication of the thermoplastic resin therebetween, said second end having a second element of a parison forming member defining an external surface angled at substantially more than 45° relative to the direction of elongation of said nozzle, said second element cooperating with said first element to define an orifice for forming and directing a parison of thermoplastic to exit the device at an angle of greater than 45° relative to the direction of elongation of said nozzle.

3. A device according to claim 2 where said nozzle includes threads formed along the exterior surface of said outlet and, said first element is a threaded annular caliper screwed onto said outlet end, said second element is a cone.

4. A device according to claim 3 wherein said caliper and cone are configured to define an orifice of diminishing width toward the exit.

5. An extrusion die for forming thermoplastic tubing having external solid ribbing, and a smooth cylindrical inner surface, comprising:

an extrusion head having an inlet for extrudate and a central bore, an elongated nozzle including a flange attachable to said extrusion head, an extrudate supply passage extending from the extrusion head and an outlet, means for attaching said nozzle to said head, a mandrel dimensioned to be placed in said supply passage in a substantially coaxial relation with said nozzle and spaced apart therefrom, said mandrel having an outlet defining element which cooperates with said nozzle outlet to define an outlet orifice, means for connecting said mandrel to said extrusion head, adjustment means for translating said mandrel outlet defining element relative to said nozzle outlet to select the size of said outlet orifice, and means for forming a parison of extrudate issuing from said outlet at an angle of substantially more than 45° including said nozzle outlet and mandrel outlet defining element which are configured to direct the parison issuing from said outlet at an angle of substantially more than 45° relative to the direction of the translation axis of said mandrel defining element.

6. An extrusion assembly for forming solid ribbed thermoplastic tubing, comprising:

an extrusion head having a central bore with an opening for receiving an extrudate of a thermoplastic material under pressure therefrom, an elongate nozzle attached to said head having a delivery end and providing a supply passage extending in the longitudinal direction thereof for the delivery of said extrudate to the delivery end thereof;

a mandrel placed in said bore in substantially coaxial relation with said nozzle and spaced from the latter to provide a plastic conducting passage extending in the longitudinal direction thereof for the delivery of said extrudate to the delivery end thereof, means for forming a parison including a single extrusion orifice at said delivery end through which the extrudate flows uninterruptedly to form a parison which issues from said orifice at an angle of greater than 45° relative to the direction of elongation of said passage, and mold blocks possessing interior annular recesses where the parison exiting said orifice flow uninterruptedly into said recesses to form solid annular ribs.

7. An extrusion die according to claim 6 wherein said extrusion orifice is annular and features diminishing interior dimensions to increase the velocity of the exiting parison.

* * * * *